United States Patent
Lemme

(10) Patent No.: US 10,135,520 B2
(45) Date of Patent: Nov. 20, 2018

(54) SYSTEM AND METHOD FOR COMMUNICATING VIA A SATELLITE IN AN INCLINED GEOSYNCHRONOUS ORBIT

(71) Applicant: Peter Lemme, Kirkland, WA (US)

(72) Inventor: Peter Lemme, Kirkland, WA (US)

( * ) Notice: Subject to any disclaimer, the term of this patent is extended or adjusted under 35 U.S.C. 154(b) by 781 days.

(21) Appl. No.: 14/657,336

(22) Filed: Mar. 13, 2015

(65) Prior Publication Data

US 2016/0268677 A1 Sep. 15, 2016

(51) Int. Cl.
*H04B 7/19* (2006.01)
*H04B 7/185* (2006.01)

(52) U.S. Cl.
CPC ........... *H04B 7/18513* (2013.01); *H04B 7/19* (2013.01)

(58) Field of Classification Search
CPC . H04W 72/04; H04W 72/044; H04W 72/046; H04W 72/0473; H04W 72/048; H04W 72/08; H04W 72/082; H04W 72/12; H04B 7/18513; H04B 7/18517; H04B 7/19; H04B 7/18521; H04B 7/18578; H04B 7/18543; H04B 7/195; H04B 7/216; H04B 7/2041; H04B 7/18506; H04B 7/1851; H04B 7/18528; H04B 7/18523; B64G 1/1007; B64G 1/1085; B64G 1/18543; H01Q 3/02; H01Q 3/24; H01Q 3/34; H01Q 1/1257
USPC ...................................... 342/357.4
See application file for complete search history.

(56) References Cited

U.S. PATENT DOCUMENTS

| | | | | |
|---|---|---|---|---|
| 3,836,969 A | * | 9/1974 | Bond ................... | B64G 1/1007 342/356 |
| 4,375,697 A | * | 3/1983 | Visher ..................... | H04B 7/19 244/158.4 |
| 5,077,561 A | * | 12/1991 | Gorton ..................... | G01S 3/42 342/359 |
| 5,589,834 A | * | 12/1996 | Weinberg ................. | H04B 7/19 342/354 |
| 6,019,318 A | * | 2/2000 | Cellier ................. | B64G 1/1007 244/158.4 |

(Continued)

*Primary Examiner* — Bernarr E Gregory
*Assistant Examiner* — Nuzhat Pervin
(74) *Attorney, Agent, or Firm* — Brooks Kushman P.C.

(57) ABSTRACT

A hub terminal and remote client communicate via a target satellite in an inclined geosynchronous orbit. As the target satellite ascends or descends away from the geostationary arc, the signal strength of the uplink channel is increased without increasing the level of interference with geostationary satellites. The increased angular separation from geostationary satellites also decreases downlink interference. The resulting increase in signal strength permits adjustment of the modulation and coding parameters to increase spectral efficiency. The antenna gain pattern is modeled based on antenna characteristics and the model may be supplemented with measurements of a signal relayed by other satellites. The method permits intermittent communication with an inclined satellite sharing a geostationary slot with a station-kept satellite, or from locations where the geostationary arc is blocked, or while using disadvantaged antennas that would be impractical for use with geostationary satellites. In some circumstances, it is desirable to deliberately mis-steer the antenna slightly away from the target satellite.

7 Claims, 27 Drawing Sheets

(56) References Cited

U.S. PATENT DOCUMENTS

| | | | | |
|---|---|---|---|---|
| 6,032,041 A * | 2/2000 | Wainfan | ............ | H04B 7/18578 |
| | | | | 455/12.1 |
| 6,085,067 A * | 7/2000 | Gallagher | ............ | H04W 52/40 |
| | | | | 455/13.1 |
| 6,126,116 A | 10/2000 | Cellier | | |
| 6,226,493 B1 * | 5/2001 | Leopold | ............ | H04B 7/19 |
| | | | | 455/13.1 |
| 6,281,853 B1 * | 8/2001 | Caille | ............ | H01Q 3/02 |
| | | | | 343/753 |
| 6,325,332 B1 | 12/2001 | Cellier et al. | | |
| 6,327,523 B2 * | 12/2001 | Cellier | ............ | H04B 7/195 |
| | | | | 244/158.4 |
| 6,339,707 B1 * | 1/2002 | Wainfan | ............ | H04B 7/18578 |
| | | | | 455/12.1 |
| 6,701,126 B1 * | 3/2004 | Draim | ............ | B64G 1/1085 |
| | | | | 455/12.1 |
| 6,766,987 B2 * | 7/2004 | Taormina | ............ | H04B 7/195 |
| | | | | 244/158.4 |
| 7,369,809 B1 * | 5/2008 | Wang | ............ | H04B 7/18523 |
| | | | | 455/12.1 |
| 7,539,456 B2 * | 5/2009 | Harles | ............ | H04B 7/19 |
| | | | | 455/12.1 |
| 7,630,683 B2 * | 12/2009 | de La Chapelle | ............ | |
| | | | | H04B 7/18506 |
| | | | | 455/12.1 |
| 7,750,863 B2 * | 7/2010 | Wesel | ............ | H04B 7/18578 |
| | | | | 343/702 |
| 7,877,089 B2 * | 1/2011 | Wang | ............ | H04B 7/18521 |
| | | | | 455/12.1 |
| 8,068,827 B2 * | 11/2011 | Miller | ............ | H04B 7/18528 |
| | | | | 455/12.1 |
| 8,213,929 B2 * | 7/2012 | Miller | ............ | H04B 7/18528 |
| | | | | 455/12.1 |
| 8,897,769 B2 * | 11/2014 | Miller | ............ | H04B 7/18528 |
| | | | | 455/12.1 |
| 9,270,363 B1 * | 2/2016 | Wang | ............ | H04B 7/18521 |
| 2001/0045494 A1 * | 11/2001 | Higgins | ............ | B64G 1/1007 |
| | | | | 244/158.4 |
| 2002/0097690 A1 * | 7/2002 | Fleeter | ............ | H04B 7/216 |
| | | | | 370/316 |
| 2002/0160710 A1 * | 10/2002 | Castiel | ............ | H04B 7/195 |
| | | | | 455/12.1 |
| 2002/0168973 A1 * | 11/2002 | Dent | ............ | H04B 7/18513 |
| | | | | 455/427 |
| 2003/0073404 A1 * | 4/2003 | Sauvageot | ............ | H04B 7/2041 |
| | | | | 455/13.1 |
| 2004/0110467 A1 * | 6/2004 | Wang | ............ | H04B 7/18513 |
| | | | | 455/12.1 |
| 2006/0276128 A1 * | 12/2006 | Castiel | ............ | H04B 7/195 |
| | | | | 455/12.1 |
| 2008/0064328 A1 * | 3/2008 | Wesel | ............ | H04B 7/18578 |
| | | | | 455/13.3 |
| 2010/0001142 A1 * | 1/2010 | Goodzeit | ............ | B64G 1/1007 |
| | | | | 244/164 |
| 2010/0045510 A1 * | 2/2010 | Lopez | ............ | H01Q 1/1257 |
| | | | | 342/174 |
| 2010/0201566 A1 * | 8/2010 | Wyler | ............ | H04B 7/18513 |
| | | | | 342/354 |
| 2011/0007646 A1 * | 1/2011 | Miller | ............ | H04B 7/18513 |
| | | | | 370/252 |
| 2012/0034866 A1 * | 2/2012 | Miller | ............ | H04B 7/18528 |
| | | | | 455/12.1 |
| 2013/0062471 A1 * | 3/2013 | Lim | ............ | B64G 1/1007 |
| | | | | 244/158.6 |
| 2013/0182790 A1 * | 7/2013 | Jalali | ............ | H01Q 3/24 |
| | | | | 375/285 |
| 2013/0215781 A1 * | 8/2013 | Giffin | ............ | H04B 7/18578 |
| | | | | 370/252 |
| 2013/0309961 A1 * | 11/2013 | Lim | ............ | H04B 7/1851 |
| | | | | 455/13.3 |
| 2015/0215029 A1 * | 7/2015 | Lemme | ............ | H04B 7/18513 |
| | | | | 342/359 |
| 2015/0311972 A1 * | 10/2015 | Mengwasser | ...... | H04B 7/18515 |
| | | | | 370/316 |
| 2016/0087339 A1 * | 3/2016 | Bull | ............ | H01Q 3/34 |
| | | | | 342/367 |

* cited by examiner

SYSTEM AND METHOD FOR COMMUNICATING VIA A SATELLITE IN AN INCLINED GEOSYNCHRONOUS ORBIT

TECHNICAL FIELD

The present disclosure relates to the field of satellite communication. More particularly, the present disclosure relates to system and methods that utilize satellites in inclined geosynchronous orbits.

BACKGROUND

Global communication often relies upon satellites to relay information. A typical satellite communications system is illustrated in FIG. 1. To send information on a forward channel from a hub 30 to a client 32, the hub 30 converts the information into a radio frequency uplink signal 34 and transmits it to a satellite 36. Satellite 36 transmits a downlink radio frequency signal 38 to client 32. Satellite 36 produces the downlink radio frequency signal 38 by amplifying the uplink signal 34 and shifting it to a different frequency. The client 32 processes the downlink radio frequency signal 38 to reproduce the information. To send information on a return channel from client 32 to hub 30, the process is reversed. Client 32 transmits an uplink signal 40 to satellite 36 and then satellite 36 transmits a downlink signal 42 to hub 30. In this context, the term client may include a fixed client or a mobile client, such as a client onboard an aircraft in flight. The hub is simply another client that may include management functions.

Typically, the client antennas are highly directional. The gain is much stronger in the direction the antenna is aimed, called the boresite, than the gain in other directions. When receiving, a directional antenna is much more sensitive to signals arriving from the boresite than it is to signals arriving from other directions. Several factors limit the gain of antennas as a function of angular offset from the boresite. Beamwidth is commonly defined as the angular span between points three dB down from the boresite peak gain (half power). Antennas provide discrimination through higher gain along the boresite than in other directions. Beamwidth varies inversely with aperture width, or span in physical terms. Wider aperture results in smaller beamwidth. In some applications, such as mobile users, large antennas are impractical. Smaller antennas have larger beamwidths and thus less discrimination towards adjacent satellites when compared to larger antennas. Beam steering error occurs between the intended and the actual absolute pointing of the antenna boresite, both at the hub and the client, and for both the transmit boresite and receive boresite, which are not necessarily coincident.

Communication has to contend with interference from users of adjacent satellites. FIG. 2 illustrates interference associated with an uplink. Due to the limits of directional antennas, although unrelated clients 44 and 46 are aiming their signals 48 and 50 at satellites 52 and 54 respectively, attenuated signals 56 and 58 will also arrive at target satellite 36. These interfering signals are then included in the downlink signal transmitted from satellite 36. As shown in FIG. 3, a similar interference issue applies to downlink communications. Downlink signals 60 and 62 from adjacent satellites 52 and 54, which are intended for unrelated clients, arrive at client 32 along with the intended downlink signal 38 from satellite 36. Since the gain of client 32 receive antenna is lower towards satellites 52 and 54 than towards target satellite 36, the interference signals are attenuated but not entirely removed.

The received radio frequency signal is the combination of the encoded radio frequency signal with useful information, noise, and various attenuated interference signals. The presence of noise and interference signals may occasionally result in errors when the receiver decodes the received signal to recover the information. The error rate is influenced by the ratio of the intended signal strength to the noise and interference signal strength, the information rate, the modulation, carrier frequency, guard bands, symbol rate, and error-correction or coding parameters.

A common practice for communication via geosynchronous satellites is to establish the boresite gain, modulation parameters, and coding parameters based on management of interference to adjacent satellites. A model of the antenna radiation pattern is developed for each antenna based on range measurements to predict the off-axis gain in relation to the boresite gain at various relative azimuth and elevation off-axis angles from boresite. A combination of satellite position, skew angle, beam steering error, etc. resulting in an estimate of the attenuation to adjacent satellites is determined. A boresite gain that will satisfy the regulatory maximum interference to adjacent geostationary satellites in this worst case condition is selected. Modulation and coding parameters are then selected based on maximizing information rate with acceptable error rate while compliant under the worst case. Lower discrimination towards adjacent satellites results in increased bandwidth (spectrum) requirements for smaller antennas than larger antennas, for any given situation.

BRIEF DESCRIPTION OF THE DRAWINGS

FIG. 14 is a series of graphs illustrating how the translated EIRP spectral density mask is determined for a given antenna at various target satellite declinations.

SUMMARY OF THE DISCLOSURE

Figure 1:
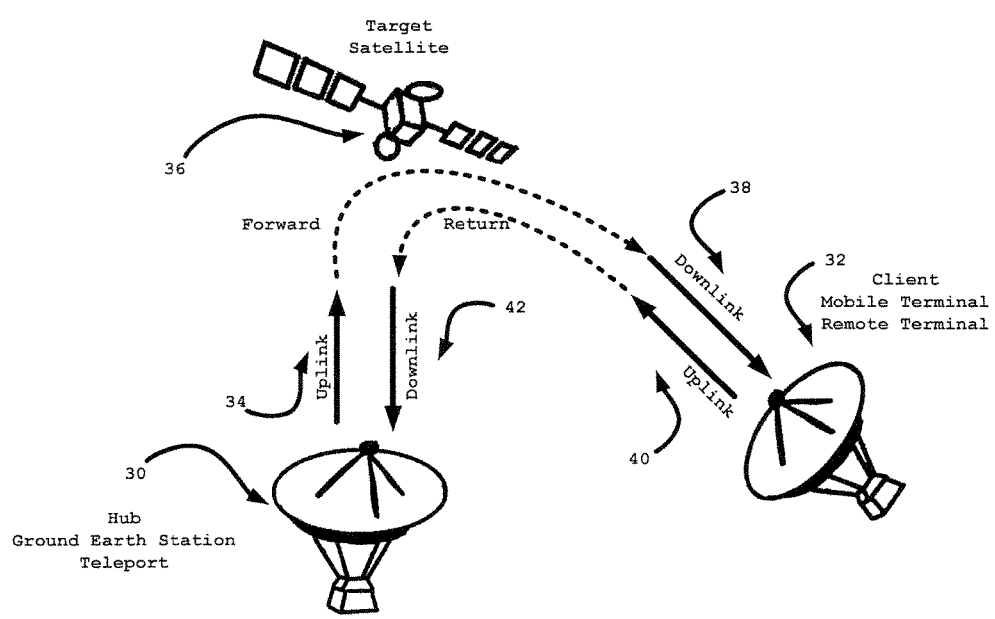
FIG. 1 is a diagram showing a satellite communication system.
Figure 2:
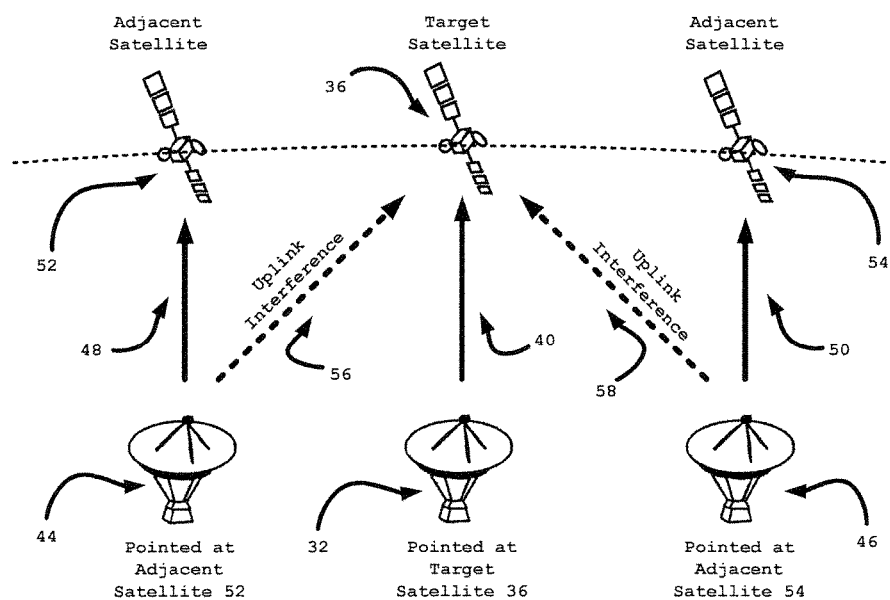
FIG. 2 is a diagram showing how uplink transmissions to other satellites are received as interference by a target satellite.
Figure 3:
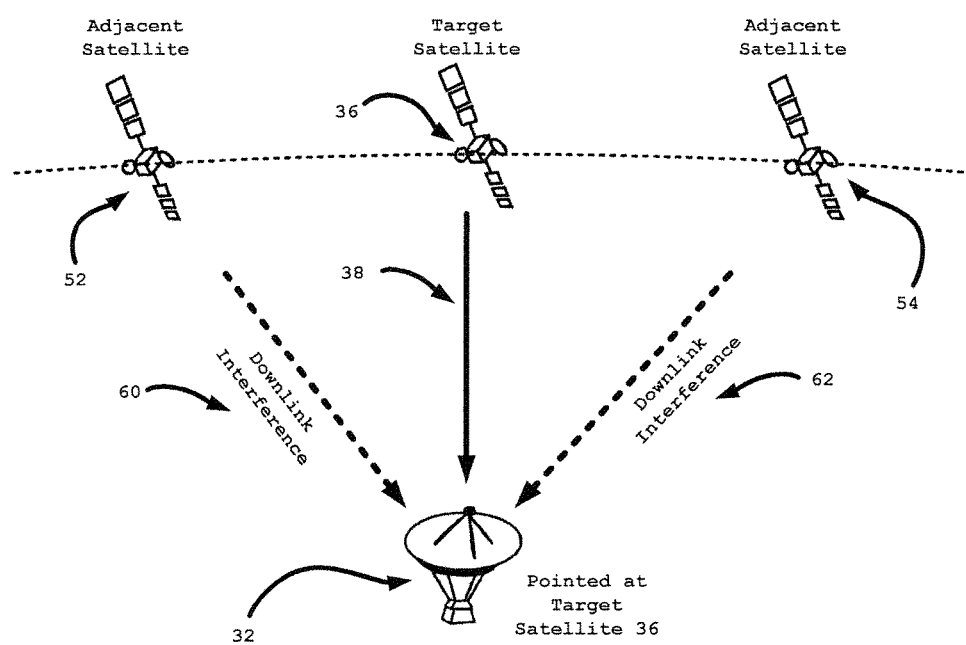
FIG. 3 is a diagram showing how downlink transmissions from other satellites are received as interference by a client.

A method of communicating via satellite includes locating a target satellite in an inclined geosynchronous orbit, pointing an antenna at an aiming point offset from the geostationary arc, and then transmitting a signal to the target satellite in response to the absolute value of the satellite's declination increasing above a threshold. The method may further include suspending the transmission in response to the absolute value of the declination decreasing below the threshold and later resuming the transmission in response to the absolute value of the declination again increasing above the threshold. The threshold may be based on an object which blocks communication with the target satellite when the target satellite is on the geostationary arc. Alternatively, the threshold may be based on avoiding interference with a geostationary satellite sharing a geostationary slot with the target satellite. When geosynchronous satellites cross the geostationary arc at right ascensions within one and one half degrees of one another, that is an indication that the two satellites share a geosynchronous slot.

In another embodiment, a method of communicating via satellite includes locating a target satellite in an inclined geosynchronous orbit that shares a geosynchronous slot with a geostationary satellite, pointing an antenna at an aiming point offset from the geostationary arc, estimating a maximum boresite Equivalent Isotropic Radiated Power (EIRP) Spectral Density (SD) that complies with a predetermined EIRP SD toward the geostationary satellite, and transmitting a radio frequency signal to the target satellite at a boresite EIRP SD no greater than the maximum EIRP SD. Transmission of the signal may be suspended in response to an angular separation between the target satellite and the geostationary satellite decreasing below a threshold and may then be resumed in response to the angular separation increasing above the threshold.

A communications transmitter includes a directional antenna, an antenna pointing control, a modulator, an amplifier, and a processor programmed to calculate a maximum boresite EIRP SD that complies with a predetermined EIRP SD toward a geostationary satellite that shares a geosynchronous slot with a target satellite, and transmitting a radio frequency signal to the target satellite at a boresite EIRP SD no greater than the maximum EIRP SD. Transmission of the signal may be suspended in response to an angular separation between the target satellite and the geostationary satellite decreasing below a threshold and may then be resumed in response to the angular separation increasing above the threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 4:
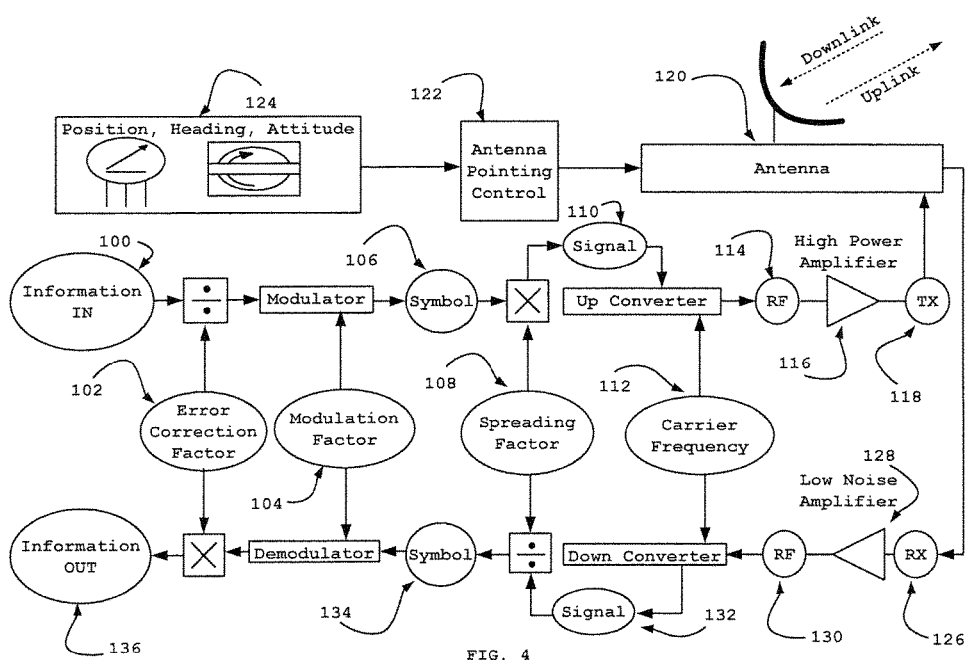
FIG. 4 is a schematic functional representation of a satellite terminal.

Two-way wireless communications rely on a pair of radio channels, one to transmit information and one to receive information. A satellite terminal is illustrated in FIG. 4. Information to be sent 100 is factored by an error correction code 102 and a modulation factor 104 resulting in encoded symbols 106. The symbols are multiplied by spreading factor 108 completing the creation of signal 110. Signal 110 is mixed with a carrier frequency 112 (block up-converter) and the Radio Frequency (RF) heterodyne sum output signal 114 is then amplified 116 and presented to the Transmit (TX) 118 port of the antenna 120. Antenna 120 then radiates the TX signal as an uplink transmission. The antenna pointing control 122 is referenced to position, heading, and attitude information 124 whether during fixed alignment or mobile operation. Antenna 120 receives an independent downlink signal at the Receive (RX) port 126 and passes it through low noise amplifier 128 resulting in an RF signal 130. The RF signal 130 is mixed with the carrier frequency 112 to create a heterodyne difference output signal 132 (block down-converter). Any spreading factor 108 is removed from the signal 132 and the symbols 134 are demodulated 104 and errors corrected 102 to produce information output 136. Modulation and coding parameters 102, 104, 108, and 112 are all applied independently between the uplink transmission and the downlink reception for a given terminal. Modulation and coding parameters are consistent when communicating along a channel from an uplink from one terminal to the downlink of another terminal.

Figure 5:
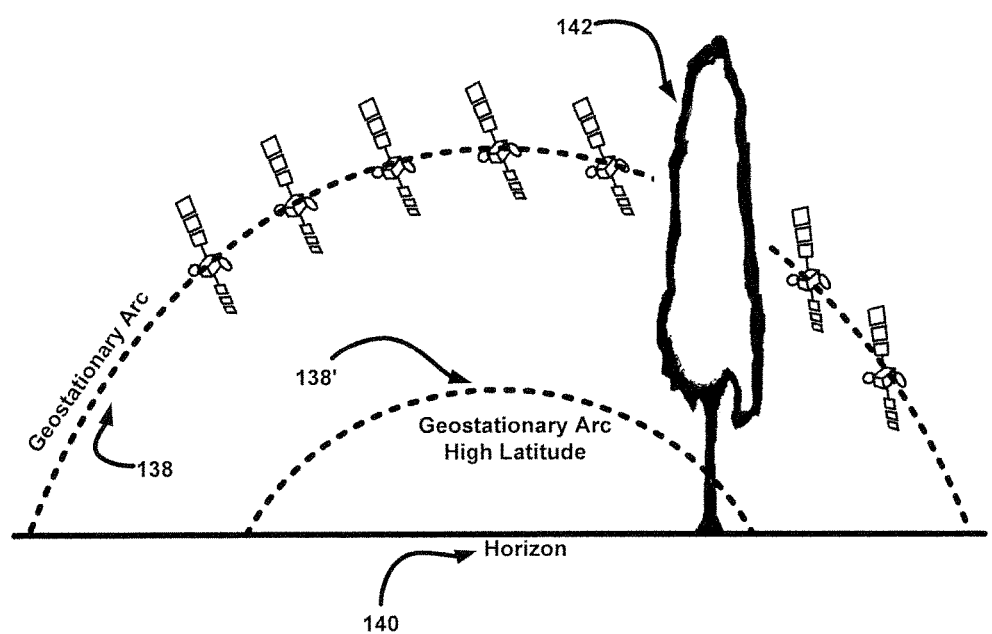
FIG. 5 is a diagram showing the location of geostationary satellites relative to the horizon as viewed from a given location.

Communications satellites may be maintained in geostationary orbits such that, when viewed from a particular location on earth, they do not appear to be moving. A geostationary orbit is a circular orbit in the same plane as the earth's equator with an altitude of approximately 35,790 km such that the orbital period is one day. From a given location, a geostationary satellite is in a fixed position along a geostationary arc 138, as shown in FIG. 5. At low latitudes, geostationary arc 138 is high above the horizon 140 while at high latitudes, the geostationary arc 138' is near the horizon. In some locations, portions of the geostationary arc may be blocked as shown at 142, making some geostationary satellites unusable from those locations.

The satellite operator maintains the position of the satellite within specified limits in order to ensure a minimum regulatory spacing between adjacent geostationary satellites while catering to clients using fixed satellite terminals. Geostationary satellites use propellant to maintain their position over a particular spot on the equator. Without actively maintaining their position, the satellites would tend to gradually drift into an orbit that is aligned with the ecliptic plane, the plane in which the Earth orbits around the Sun, as opposed to the equatorial plane. Once a satellite's propellant is exhausted, the satellite can no longer stay in geostationary position.

Governments have established regulations to ensure that users of adjacent geostationary satellites do not interfere excessively with one another's transmissions. First, governments allocate geostationary slots to particular users. For example, a slot may be spaced as close as two degrees apart along the geostationary orbit plane. Second, governments require that users limit the power of their transmissions such that the interference to or from adjacent geostationary satellites is below a regulatory threshold.

The actual power radiated in a particular direction is commonly referred to as Equivalent Isotropic Radiated Power (EIRP). EIRP is the result of taking the modulated output of high power amplifiers at a radio frequency and radiating through an antenna with a given boresite gain and radiation pattern. EIRP is delivered over a radio frequency, wherein there is a carrier frequency and a bandwidth about which the transmit signal is modulated. EIRP spectral density, also referred to as Power Spectral Density (PSD), is a measure of the EIRP (dBW) factored by the bandwidth of the modulated signal (kHz). To normalize EIRP spectral density measurements, the peak emissions are measured in peak EIRP (dBW) against a fixed bandwidth (e.g. 4 kHz). The peak EIRP is factored by the fixed bandwidth as compared to the modulated bandwidth. Notably, a given peak EIRP with no modulation or bandwidth (carrier wave, CW) would have infinite EIRP spectral density. EIRP spectral density is a variable utilized for managing interference to adjacent satellites. Regulations may not limit EIRP spectral density towards the target satellite but apply strict limits to off-axis EIRP spectral density as directed towards adjacent satellites. These off-axis EIRP spectral density limits are expressed as a function of the angle of emissions and are commonly referred to as the off-axis EIRP spectral density mask or Power Spectral Density mask.

Figure 6:
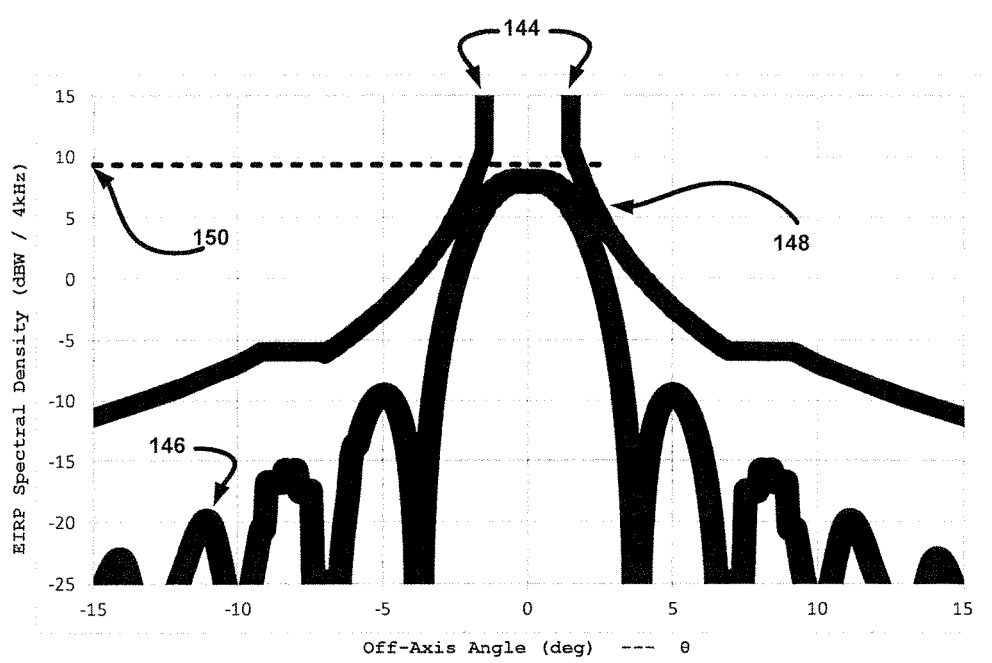
FIG. 6 is a graph illustrating the relationship between the maximum EIRP spectral density along the geostationary arc and a radiation pattern for a given antenna pointed towards a geo stationary satellite.

A typical maximum permitted EIRP spectral density mask is defined as a function of off-axis ($\Theta$) angle along the geostationary arc as shown by curve 144 in FIG. 6. The mask begins at some non-zero off-axis angle, such as 1.5 degrees, and proceeds in both directions to encompass the entire geostationary arc. Antenna radiation patterns include sidelobes with peaks and nulls as shown by curve 146. EIRP is effectively the antenna boresite gain scaled by the high power amplifier output. A modulated output of the high power amplifier is EIRP spectral density to which the antenna applies gain. The maximum EIRP spectral density is determined by scaling EIRP spectral density until it touches the EIRP spectral density mask as shown at point 148, which may be the main boresite lobe or a side lobe in some cases. Point 150 shows the permissible boresite EIRP spectral density.

Figure 7:
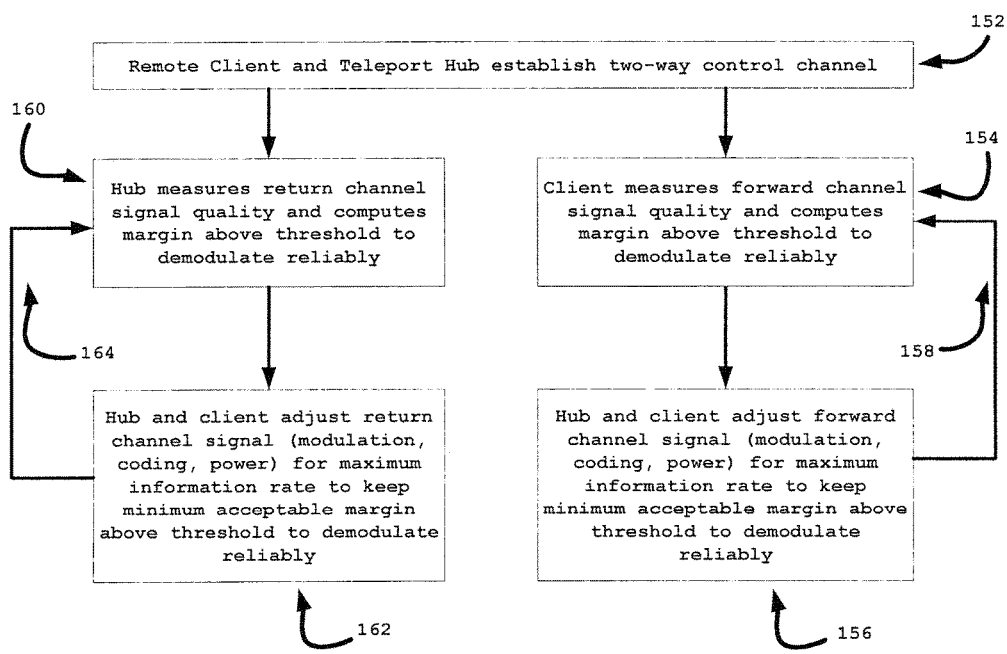
FIG. 7 is a flowchart for a closed-loop link management process.

Satellite communications may rely on a cooperative relationship between the manager hub and the remote client terminal to optimize performance. The control process between hub and client is illustrated in FIG. 7. A control channel 152 between the hub and client is established. The client measures the forward channel signal quality to determine threshold above the margin necessary to demodulate reliably at 154. The hub adjusts the forward channel signal by changing modulation, coding, information rate, and power at 156 through feedback 158 until the maximum information rate is achieved with the minimum acceptable margin above the threshold necessary for reliable demodulation. Similarly, the hub measures the return channel signal quality to determine threshold above the margin necessary to demodulate reliably at 160. The client adjusts the return channel signal by changing modulation, coding, information rate, and power at 162 through feedback 164 until the maximum information rate is achieved with the minimum acceptable margin above the threshold necessary for reliable demodulation.

Figure 8:
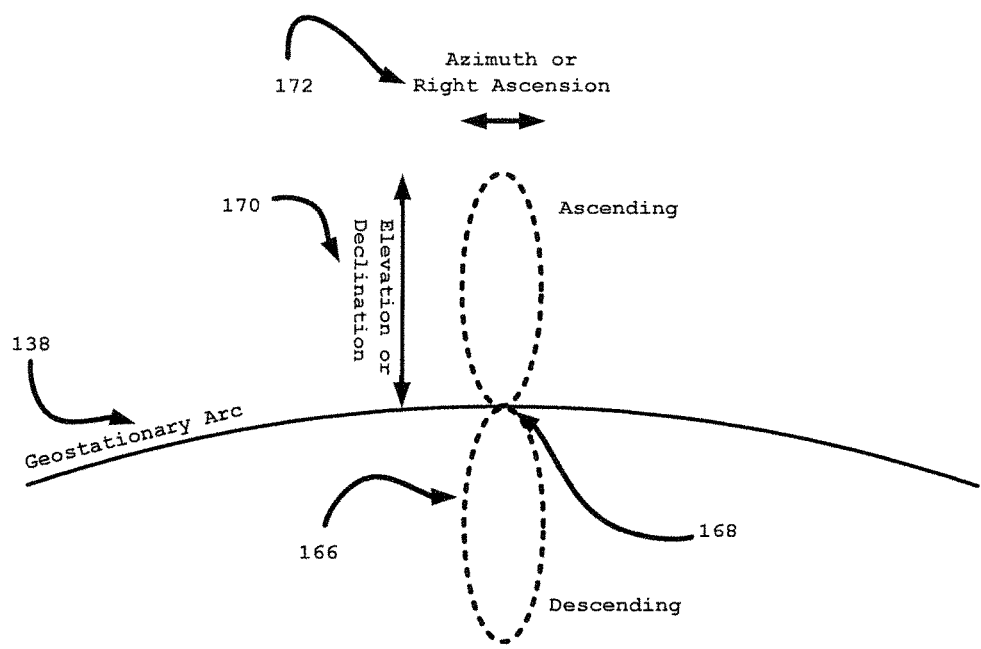
FIG. 8 is a diagram showing the apparent path of a satellite in an inclined geosynchronous orbit as viewed from a given location.

An inclined geosynchronous orbit, like a geostationary orbit, has a period of one day. However, an inclined geosynchronous orbit has a non-zero angle of declination relative to the equatorial plane. As shown in FIG. 8, as viewed from a position on earth, a satellite in an inclined geosynchronous orbit 166 traces a path centered on a point 168 on the geostationary arc 138. Satellites may be intentionally placed in inclined geosynchronous orbits or satellites in geostationary orbit may be allowed to transition to an inclined geosynchronous orbit by reducing station keeping normal to the geostationary arc 138 (declination 170). Propellant required to maintain station keeping along the geostationary arc 138 (right ascension 172) is substantially less than the propellant required to maintain station keeping declination 170. The useful life of the satellite can be extended by reducing use of propellant.

Figure 9:
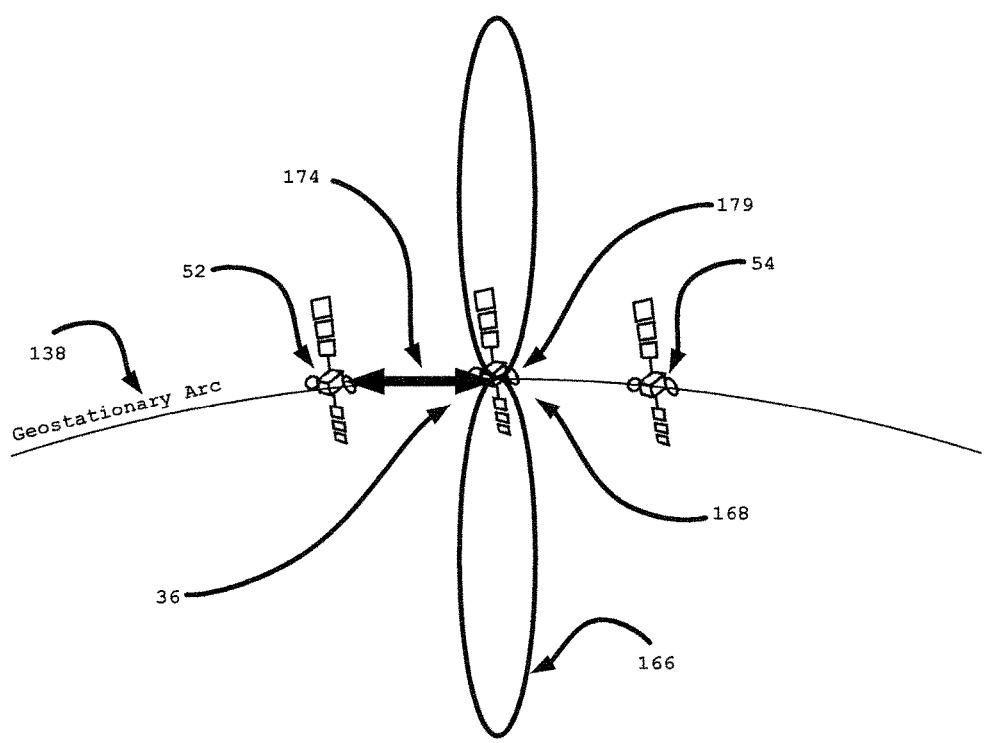
FIG. 9 is a diagram showing the angular separation between a satellite in an inclined geosynchronous orbit and an adjacent geostationary satellite when the target satellite crosses the geostationary arc
Figure 10:
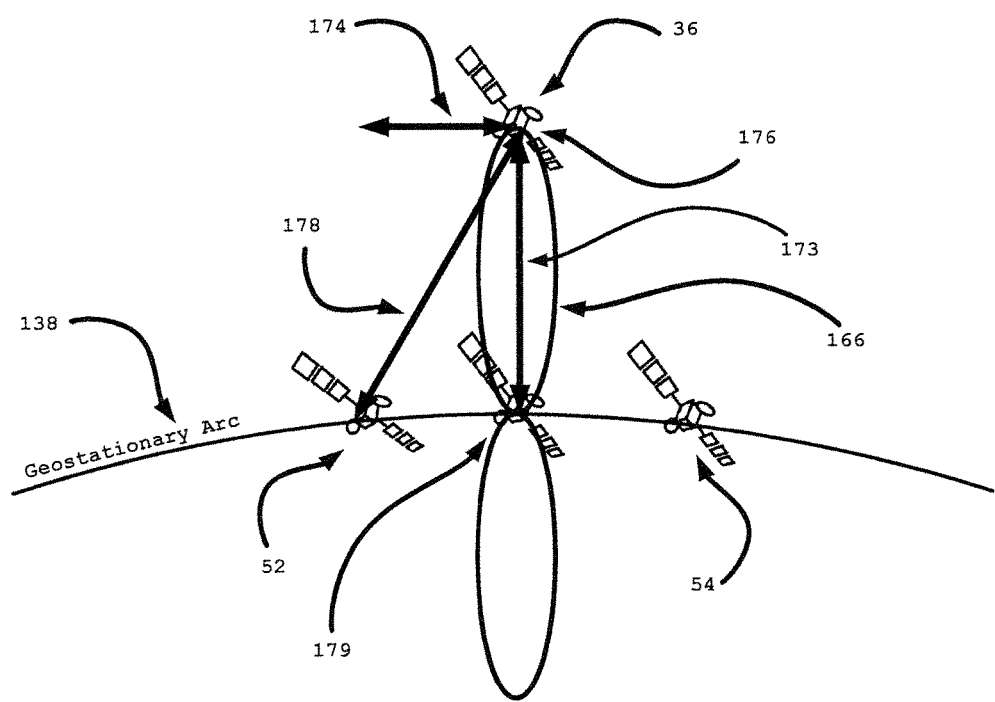
FIG. 10 is a diagram showing the angular separation between a satellite at an ascending position in an inclined geosynchronous orbit and an adjacent geostationary satellite.

Utilizing an inclined geosynchronous orbit offers several potential advantages over using a geostationary orbit if practices are modified to exploit these advantages. When the target satellite is substantially offset from the geostationary arc, its off-axis angular separation increases from any geostationary satellite. As illustrated in FIG. 9, when target satellite 36 is on the geostationary arc 138 at point 168, the off-axis angular separation to an adjacent geostationary satellite 52 is off-axis angular separation 174. As shown in FIG. 10, when target satellite 36 is inclined above the geostationary arc 138 at point 176, the off-axis angular separation 178 to the adjacent geostationary satellite 52 is larger than the off-axis angular separation 174. As shown in FIG. 10, the off-axis angular separation 173 is from satellite 36 to a station-kept geostationary satellite 179 licensed to the same orbital "slot" as satellite 36. Co-locating inclined satellite 36 with geostationary satellite 179 in one slot requires a cooperative "hot-slot" agreement. Consequently, it is possible to communicate via target satellite 36 while satellite 36 is in this position without causing excessive interference with communication via satellite 179. Government regulations prohibit interference towards or from licensed geostationary satellites, where each slot is assigned primarily one operator. However, the operator of satellite 179, as the likely licensee of the slot, may choose to permit communication via satellite 36 based on a negotiated maximum EIRP toward satellite 179 as a function of angular separation 173.

Figure 11:
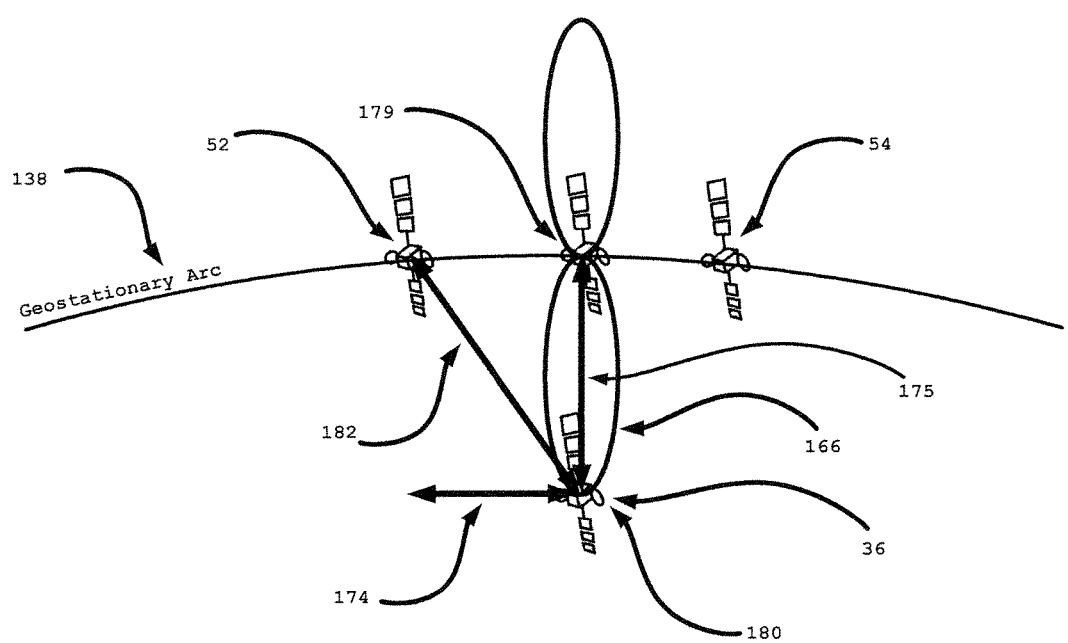
FIG. 11 is a diagram showing the relative angular separation between a satellite at a descending position in an inclined geosynchronous orbit and an adjacent geostationary satellite.

Similarly in FIG. 11, when target satellite 36 is inclined below the geostationary arc 138 at point 180, the off-axis angular separation 182 to the adjacent geostationary satellite 52 is larger than the off-axis angular separation 174. The off-axis angular separation 175 is from satellite 36 to a station-kept geostationary satellite 179 licensed to the same orbital "slot" as satellite 36. As with the situation shown in FIG. 10, communication via satellite 36 may be conducted under the terms of a cooperative "hot-slot" agreement with the operator of satellite 179, as the likely licensee of the slot.

Consequently, while the target satellite 36 is in locations 176 and 180, a particular directional antenna aimed at the target satellite 36 may transmit higher EIRP spectral density uplink while complying with the maximum level of interference for the adjacent geostationary satellites (EIRP spectral density mask). With regard to the downlink, a particular directional antenna aimed at an inclined target satellite may be more capable of attenuating interference signals from satellites along the geostationary arc. The increased uplink EIRP spectral density and lower downlink interference both increase signal strength. Spectral efficiency is a measure of the information rate (bps) factored by the bandwidth of the signal (Hz). Increasing signal strength permits encoding more information into a particular frequency spectrum, or increased spectral efficiency. Adaptive methods of adjusting EIRP, modulations and codings to operate at the most efficient spectral efficiency are effective in responding to changing signal conditions or requirements.

If target satellite 36 shares a geostationary slot with another satellite, then the EIRP spectral density of the uplink may be adjusted based on negotiated limit in addition to ensuring compliance with the regulatory spectral density mask. As target satellite 36 passes through the geostationary arc, the small angular separation between target satellite 36 and a geostationary satellite 179 sharing the same slot would likely preclude communication for fear of excessive interference. Therefore, communication would be suppressed to and from target satellite 36 during these time periods and would be resumed when the angular separation from geostationary satellite 179 increases above a threshold value. For many types of communications, such interruptions of service, which occur twice per day, are acceptable. The duration of the interruption would depend on the inclination of target satellite 36, the negotiated level of acceptable interference, and the antenna beam pattern.

Figure 12:
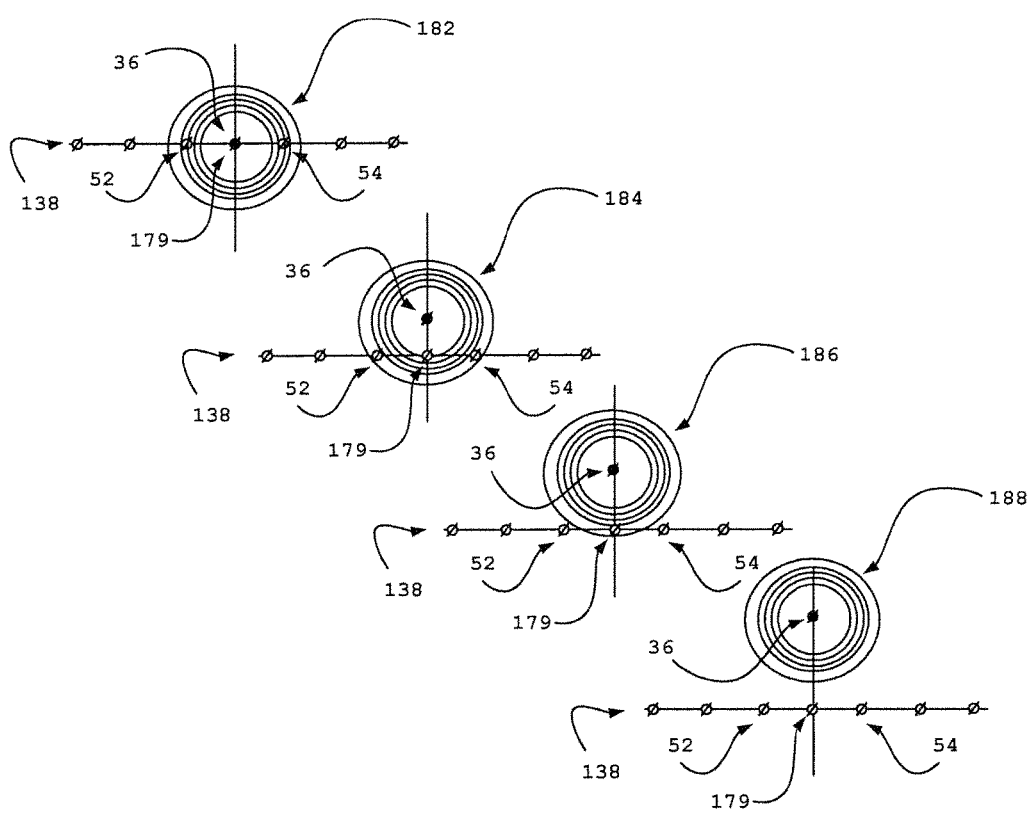
FIG. 12 is a series of diagrams showing a circular antenna gain pattern towards a target satellite at various degrees of declination.

A representation of a circular antenna gain as a function of inclination is presented in FIG. 12. The client antenna is pointed towards target satellite 36. At 182, target satellite 36 is along the geostationary arc 138. If target satellite 36 shared a geostationary slot with a geostationary satellite 179, then communication would be interrupted during this time. At 184, target satellite has moved away (inclined) from the geostationary arc 138. Reduced gain contours intersect geostationary satellites compared to 182. Target satellite 36 is further inclined in 186 and 188 with decreasing gain along the geostationary arc 138. If target satellite 36 shares a geosynchronous slot with geostationary satellite 179, communication will resume when the angular separation exceeds a threshold, as discussed above. As the inclined satellite moves away from the geostationary arc, the angular separation increases as perceived by a satellite terminal. The increased angular separation translates the EIRP spectral mask, effectively moving the mask further off-axis while compressing it slightly. The translated angular separation to a point on the geostationary arc ($\Theta'$) is the square root of the sum of the square of the declination angle and delta right ascension angle to the point on the geostationary arc. The relative angle between the inclined satellite and the geostationary arc shifts to a variable angle as a function of both declination and delta right ascension of both the target satellite 36 and a point on the geostationary arc.

Figure 13:
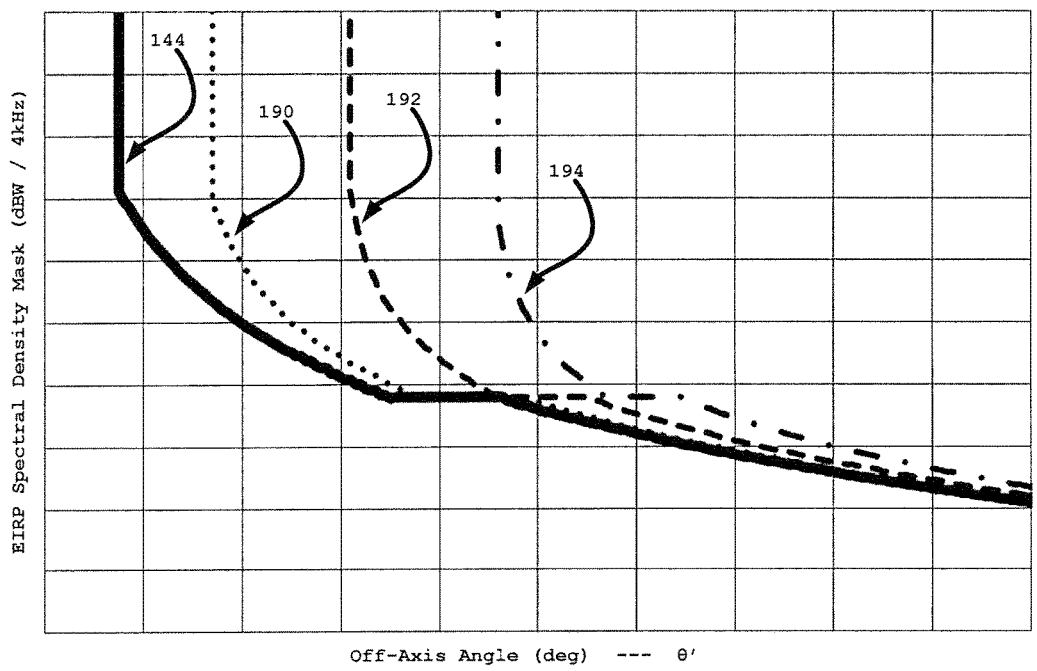
FIG. 13 is a graph showing a series of translated EIRP spectral density masks at various target satellite declinations as a function of off-axis angle.
Figure 14A:
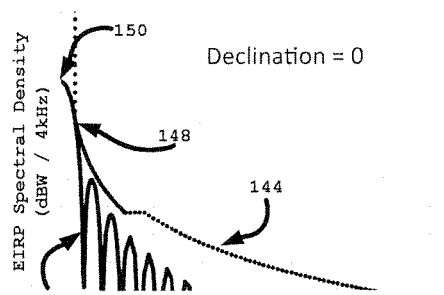
FIG. 14A, like FIG. 6, illustrates the relationship when the target satellite is on the geo-stationary arc.
Figure 14B:
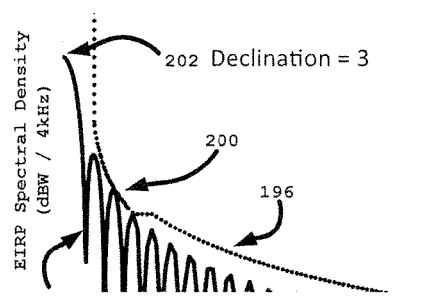
FIGS. 14B, 14C, and 14D illustrate the relationship when the target satellite declination is 3 degrees, 6 degrees, and 9 degrees, respectively.
Figure 14C:
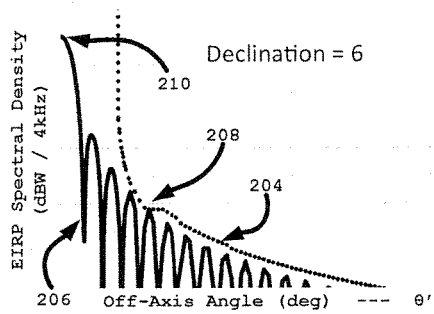
Figure 14D:
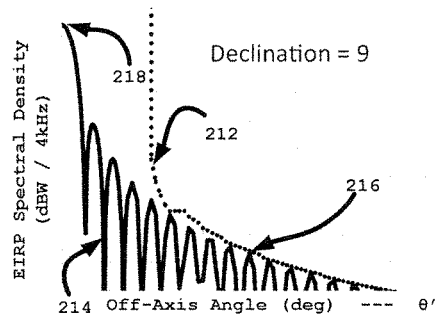

An example of a plot of EIRP spectral density limit is plotted in FIG. 13. EIRP spectral density is plotted along the y-axis. Off-axis angle ($\Theta'$) is plotted along the x-axis. Limit line 144 represents a typical EIRP spectral mask as applicable for zero declination for adjacent satellites. Limit line 144 would represent a higher declination, for example two degrees, with geostationary satellite 179 sharing the slot with target satellite 36. As discussed above, when sharing a slot with geostationary satellite 179, communications may be suppressed until angular separation exceeds a threshold. Limit line 190 is the translated EIRP spectral mask for adjacent satellites for three degrees of declination. Limit lines 192 and 194 are translated EIRP spectral mask for adjacent satellites for six and nine degrees of declination respectively. The off-axis EIRP spectral mask is translated towards higher off-axis angles with increasing angular separation. The translation of the off-axis EIRP spectral mask for geostationary satellite 179 is subject to coordinated agreements which could permit translating the EIRP spectral mask as a function of angular separation. Operating beyond some level of declination can introduce additional EIRP spectral mask and other regulatory and coordination agreements with non geostationary satellites.

FIG. 14 illustrates the effect of inclination upon maximum EIRP spectral density. As shown in FIG. 14A at zero declination, a given antenna with a given radiation pattern shape 146 intersects the adjacent satellite spectral limit 144 and intersects at point 148. The maximum boresite gain for this condition is point 150. In FIG. 14B, the same antenna is applied to a target satellite three degrees declination from the geostationary arc. The translated adjacent satellite EIRP spectral mask 196 is applied to the scaled antenna radiation pattern 198 until intersecting at point 200 with a boresite EIRP spectral density at point 202. Point 202 is higher than the zero degree declination maximum limit at point 150. In FIG. 14C, the same antenna is applied to a target satellite six degrees declination from the geostationary arc. The translated adjacent satellite EIRP spectral mask 204 is applied to the scaled antenna radiation pattern 206 until intersecting at point 208 with a boresite EIRP spectral density at point 210. Point 210 is higher than the three degree declination maximum limit at point 202. In FIG. 14D, the same antenna is applied to a target satellite nine degrees declination from the geostationary arc. The translated adjacent satellite EIRP spectral mask 212 is applied to the scaled antenna radiation pattern 214 until intersecting at point 216 with a boresite EIRP spectral density at point 218. Point 218 is higher than the six degree declination maximum limit at point 210. The EIRP spectral mask towards geostationary satellite 179 sharing the same slot as target satellite 36 is offset through a coordinated agreement as discussed above.

Figure 15:
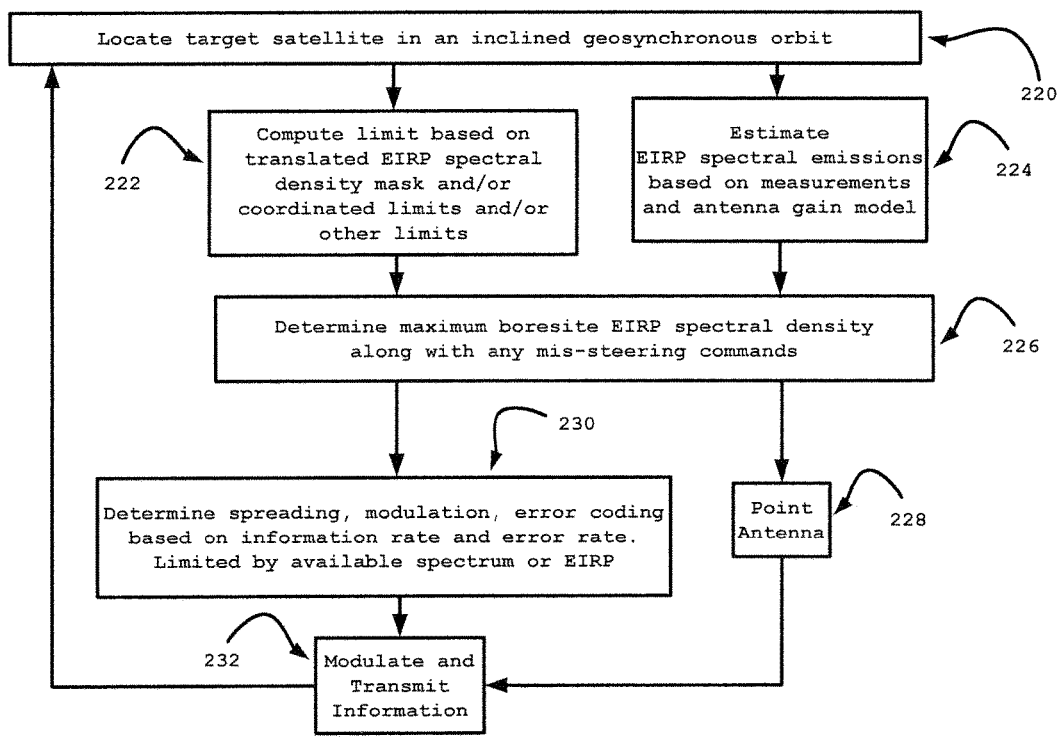
FIG. 15 is a flowchart for a first method of sending uplink information to a satellite in an inclined geosynchronous orbit.

FIG. 15 illustrates a method of sending information that takes advantage of managing interference as a function of varying angular separation. At 220, the remote client locates a target satellite in an inclined geosynchronous orbit. The target satellite position can be predicted as a function of time. The uplink channel is optimized by first calculating the off-axis angular separation from the target satellite to the geostationary orbit plane and calculating a translated EIRP spectral density mask at 222 that accounts for regulatory limits, coordinated agreements, and any other limitations. An estimate of the antenna gain toward the geostationary arc is utilized at 224, by applying the properly skewed antenna radiation pattern and any other measurements, accounting for beam steering error, to estimate the ratio of off-axis EIRP spectral density to boresite EIRP spectral density in the direction of geostationary arc. At 226, the maximum boresite EIRP spectral density is calculated such that the resultant off-axis EIRP spectral density as received by the adjacent satellites is no greater than the limit calculated at 222. The remote client steers its antenna at the target satellite at 228. As off-axis angular separation from the geostationary arc increases with declination, the permitted boresite EIRP spectral density may increase with declination, while the off-axis EIRP spectral density perceived by the adjacent geostationary satellites remains compliant. At 230, the permissible modulation parameters and coding parameters are determined to maximize information rate with acceptable error rate using available spectrum and within amplifier power limits. Finally, at 232, the client encodes and transmits the information.

The functions in FIG. 15 steps 222-230 may be distributed in various ways between a remote client, the target satellite, and the hub terminal. If the calculations are performed by the receiving client, the results are communicated to the sending client. If the calculations are performed by the sending client, the modulation and coding parameters are communicated to the receiving client to enable decoding. As the satellite moves to different positions relative to the geostationary arc, the calculations are repeated to calculate modulation parameters, coding parameters, and EIRP levels that maximize EIRP spectral density and information rate without interfering with geostationary satellites. In particular, as the target satellite moves away from the geostationary arc, the EIRP spectral density and spectral efficiency may progressively increase. As the target satellite moves towards the geostationary arc, the EIRP spectral density and spectral efficiency rate will progressively decrease to a minimum as applicable while the target satellite crosses the geostationary arc.

Figure 16:
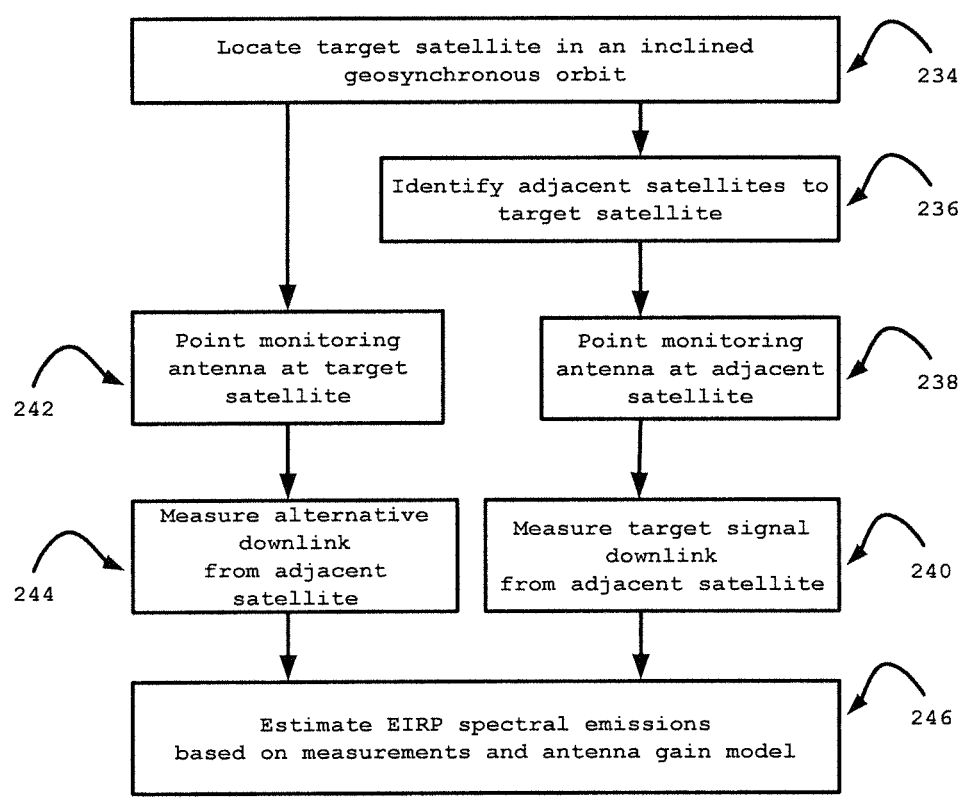
FIG. 16 is a flowchart for a method using measurements to estimate off-axis EIRP spectral density.

Estimating EIRP spectral density as a function of off-axis angle ($\Theta$) is fundamentally based on an understanding of the transmitting antenna radiation pattern and transmission path. Providing measurements offers better confidence in matching actual performance to predicted performance. A method for measuring antenna performance in real time is illustrated in FIG. 16. Once the target satellite is located at 234, adjacent satellites are identified at 236. A discriminating monitoring antenna can be pointed at an adjacent satellite at 238 which may directly measure the presence of any interference at 240. The transmitting antenna may be used as a monitoring antenna while pointed at the target satellite in step 242. Measuring known carriers from adjacent satellites in step 244 can indicate antenna gain in the direction of the adjacent satellites. The measurements from 240 and 244 can be used to estimate off-axis spectral emissions as computed in step 246.

Figure 17:
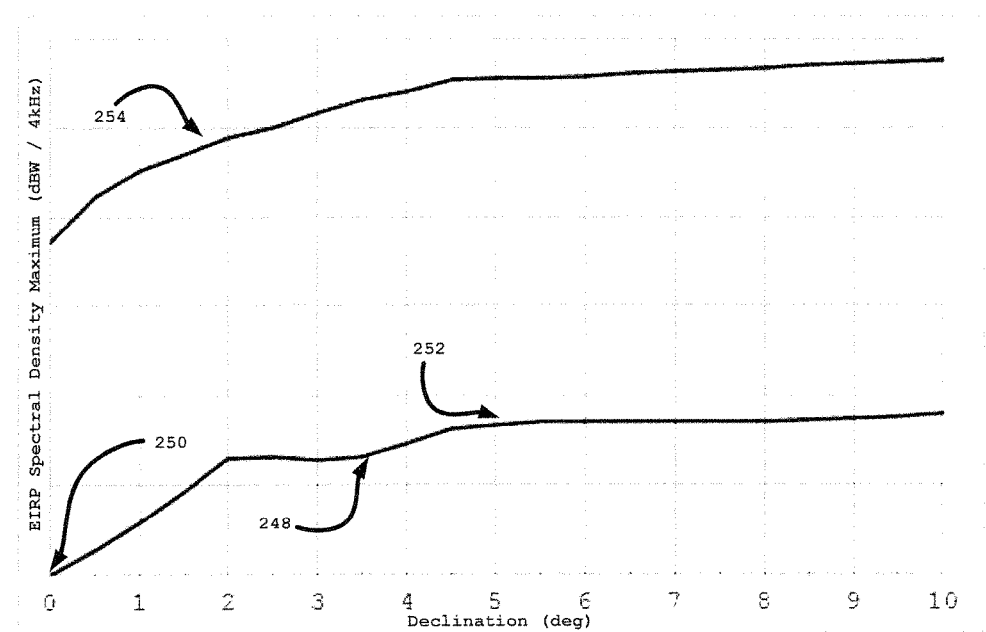
FIG. 17 is a graph showing maximum permitted EIRP spectral density for a variety of antennas as a function of target satellite declination.

A plot of a maximum EIRP spectral density for various antennas as a function of inclination is provided in FIG. 17. The x-axis represents declination from zero to ten degrees. Curve 248 represents a disadvantaged antenna such as a small diameter mobile antenna. The EIRP spectral density limit at zero degrees declination is 250 for antennas 248 is shown to rise with inclination to a point 252 where the benefits begin to saturate. Curve 254 represents a more discriminating antenna such as a large stationary antenna. Both the forward and return channel uplinks can benefit from increased permitted EIRP spectral density while at the same time both channel downlinks benefit from reduced interference.

Figure 18:
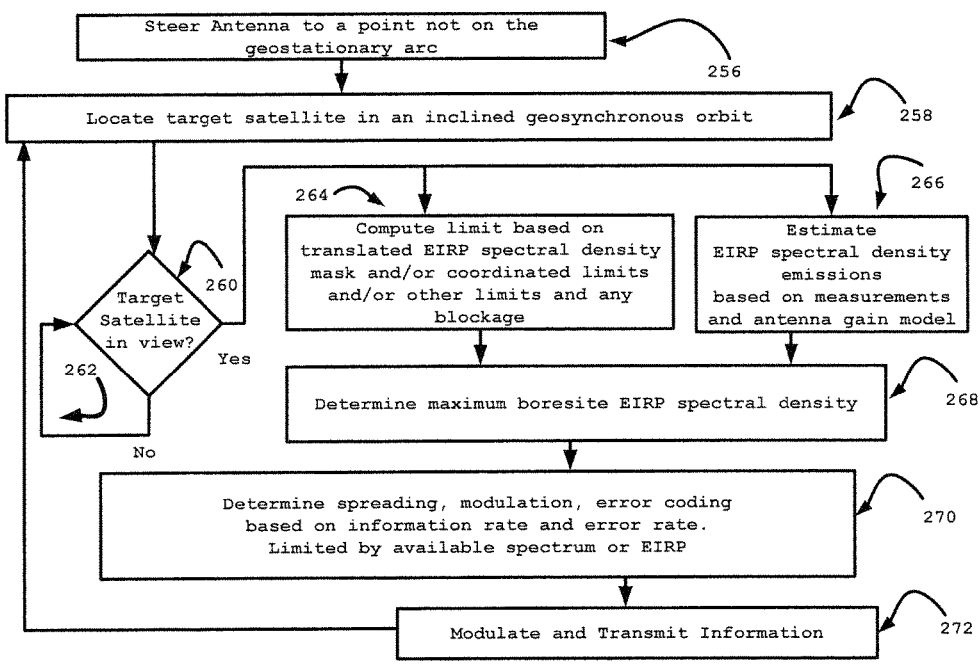
FIG. 18 is a flowchart for a second method of sending uplink information to a satellite in an inclined geosynchronous orbit where the satellite is blocked during a portion of each day.

Even when a slot on the geostationary arc is blocked by terrain or the horizon from a given position, a satellite in an inclined geosynchronous orbit around that slot may be visible for a portion of each day from that given position. FIG. 18 illustrates a method for transmitting information from a location that is blocked from at least part of the geostationary arc, or for an inclined geosynchronous satellite that shares a geostationary slot with a geostationary satellite. In such a case, the geostationary satellite may be treated as a different form of blockage. The flowchart of FIG. 18 assumes a fixed antenna, although a steerable antenna may be utilized with minor modifications. At 256, the client antenna boresite is pointed to a location that is not on the geostationary arc and that is also not blocked by terrain. At 258, the target satellite, which is in an inclined geosynchronous orbit, is located. If the target satellite is not in view from the client location at 260, the client waits at 262 until the target satellite is in view. Similarly, if the target satellite shares a slot with a geostationary satellite, the clients waits at 262 until the angular separation with the target satellite exceeds a threshold. If the antenna is steerable, the antenna is commanded to track the target satellite. The uplink channel is optimized by first calculating the off-axis angular separation from the target satellite and calculating a translated EIRP spectral density mask at 264 that accounts for regulatory limits, coordinated agreements, and any other limitations. For example, a coordinated agreement would include the limits that are negotiated with a licensee of a geostationary slot. An estimate of the antenna gain toward the geostationary arc is utilized at 266, by applying the properly skewed antenna radiation pattern and any other measurements, while accounting for beam steering error, to estimate the ratio of off-axis EIRP spectral density in the direction of other satellites. At 268, the maximum boresite EIRP spectral density is calculated such that the resultant EIRP spectral density as received by other satellites is no greater than the limit computed at 264. At 270, the permissible modulation parameters and coding parameters are determined to maximize information rate with acceptable error rate using available spectrum and allowable amplifier power limits. Finally, at 272, the client encodes and transmits the information. The functions in steps 264-270 may be distributed in various ways between a remote client, the target satellite, and the hub terminal.

Figure 19:
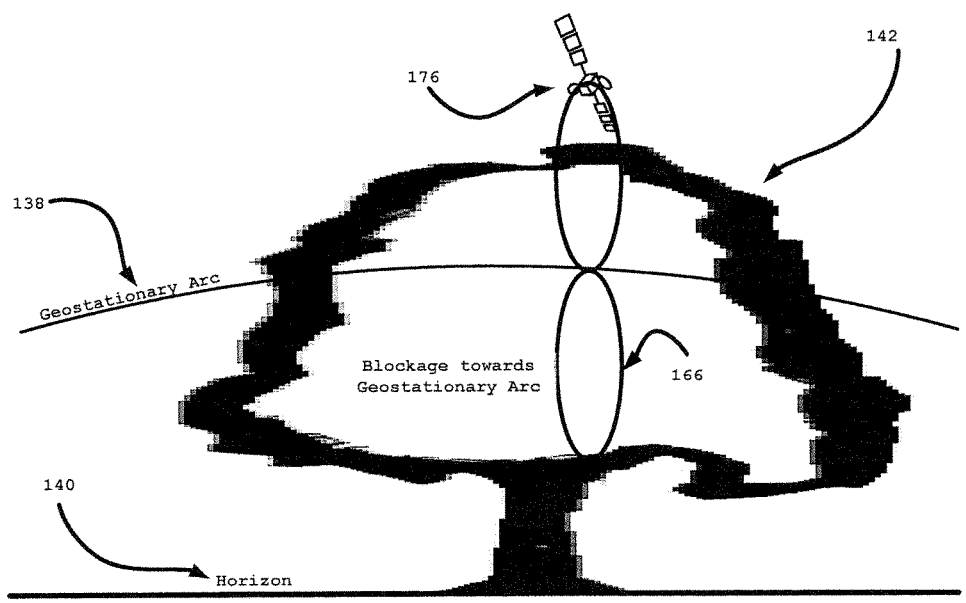
FIG. 19 is a diagram showing the view from a fixed antenna communicating with an inclined orbit satellite according to the method of FIG. 18.

FIG. 19 illustrates that the method of FIG. 18 provides communication to a target satellite during particular periods of each day along inclined orbit 166 in position 176 from a client location that would not be able to communicate with a satellite along the geostationary arc 138, perhaps due to line-of-site blockage 142. Position 176 may provide a useful target for when the geostationary arc 138 is particularly low, such as in polar locations.

Figure 20:
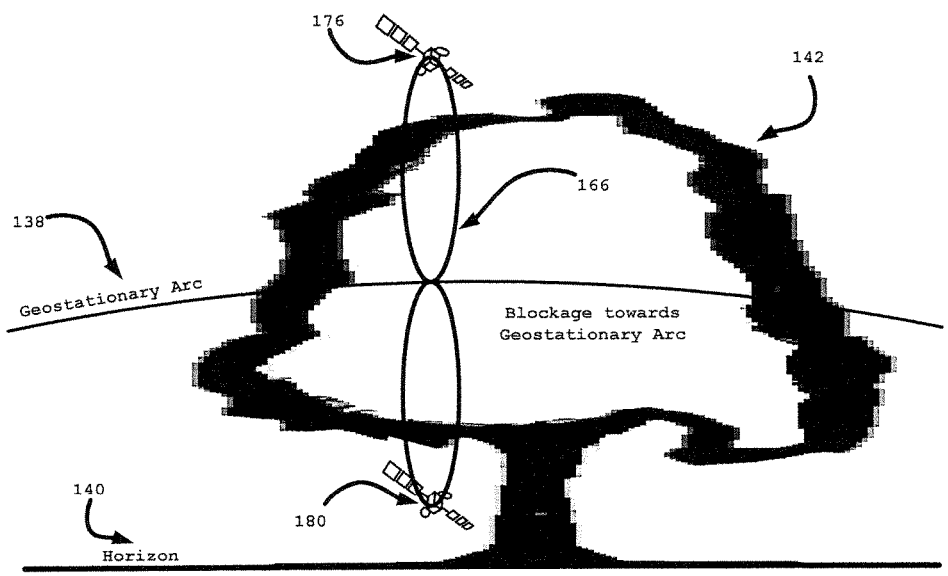
FIG. 20 is a diagram showing the view from a steerable or multi-position given antenna communicating with an inclined orbit satellite according to the method of FIG. 18.

FIG. 20 illustrates that a modified method of FIG. 18 using a steerable or multi-position antenna to allow communication at multiple times of the day. For example, the target satellite on inclined orbit 166 may only be visible at certain locations 176 when it is above the geostationary arc 138, called ascending positions, and at certain locations 180 below the geostationary arc, called descending positions, due to blockage 142 or due to the presence of a geostationary satellite sharing the same geostationary slot.

Figure 21:
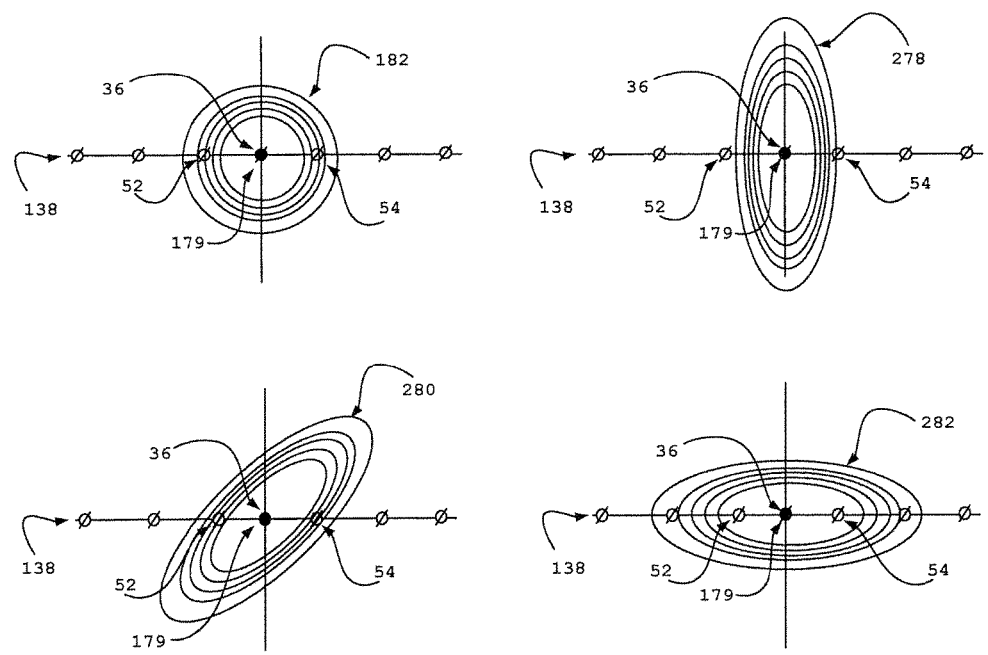
FIG. 21 is a series of diagrams illustrating various antenna radiation patterns towards a target geostationary satellite illustrating the effects of axial ratio and skew angle.

High-axial ratio antennas provide better discrimination in one axis than in the other axis. Antenna radiation patterns are modeled in both an azimuth axis and an elevation axis relative to the antenna, where the azimuth axis aligns with the most discriminating antenna axis. The most discriminating axis is along the axis with widest aperture. If possible, the antenna is oriented towards the target satellite to provide maximum discrimination towards adjacent satellites. However, in some applications, such as mobile applications, ideal orientation cannot be guaranteed. At any point in time, the actual orientation of the antenna may differ from this ideal orientation by a skew angle. Various antenna beam patterns are illustrated in FIG. 21 as examples when an antenna is pointed at the geostationary arc 138. In these cases the antenna is pointed at both target satellite 36 and geostationary satellite 179 sharing the same geostationary slot aligned on the geostationary arc 138 along with adjacent satellites. High-axial beam pattern 278 is shown where skew angle is zero, or the most discriminating axis is aligned with the geostationary arc 138. High-axial beam pattern 280 is shown with a skew angle of about 45 degrees. High-axial beam pattern 282 is shown with a skew angle of 90 degrees where the least discriminating axis is aligned with the geostationary arc 138. At high skew angles, the antenna is less effective at discriminating to adjacent satellites than while at low skew angles. As shown in FIG. 21, zero skew angle pattern 278 offers substantially more discrimination than the 90 degree skew angle pattern 282, where the nearest adjacent satellites are within the boresite gain contour, and even more than the circular gain pattern 182.

Figure 22:
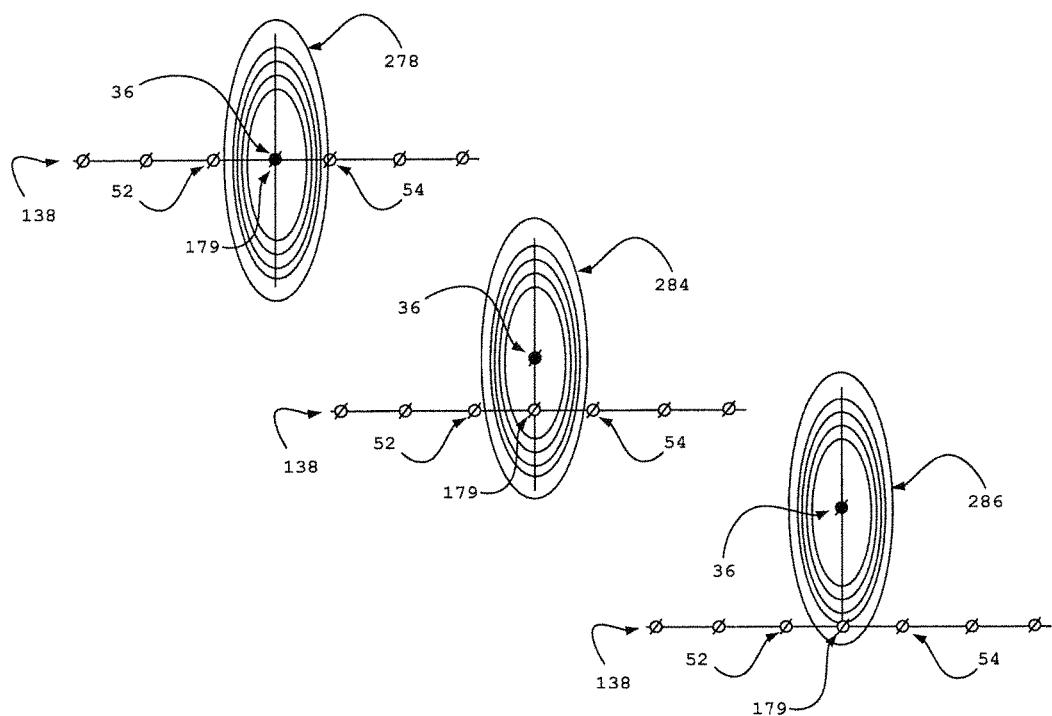
FIG. 22 is a series of diagrams illustrating the effect of target satellite declination for a high axial-ratio, zero skew angle, antenna gain pattern.

A representation of a high axial-ratio antenna at zero skew angle gain as a function of declination is presented in FIG. 22. The client antenna is pointed towards target satellite 36. At 278, target satellite 36 is along the geostationary arc 138. At 284, target satellite has moved away (inclined) from the geostationary arc 138 with minimal decrease in gain towards geostationary arc 138. Target satellite 36 is further inclined in 286 with decreasing gain along the geostationary arc 138. Although the benefit may not be as great as with a circular beam antenna, gain toward the geostationary arc decreases as the inclination increases.

Figure 23:
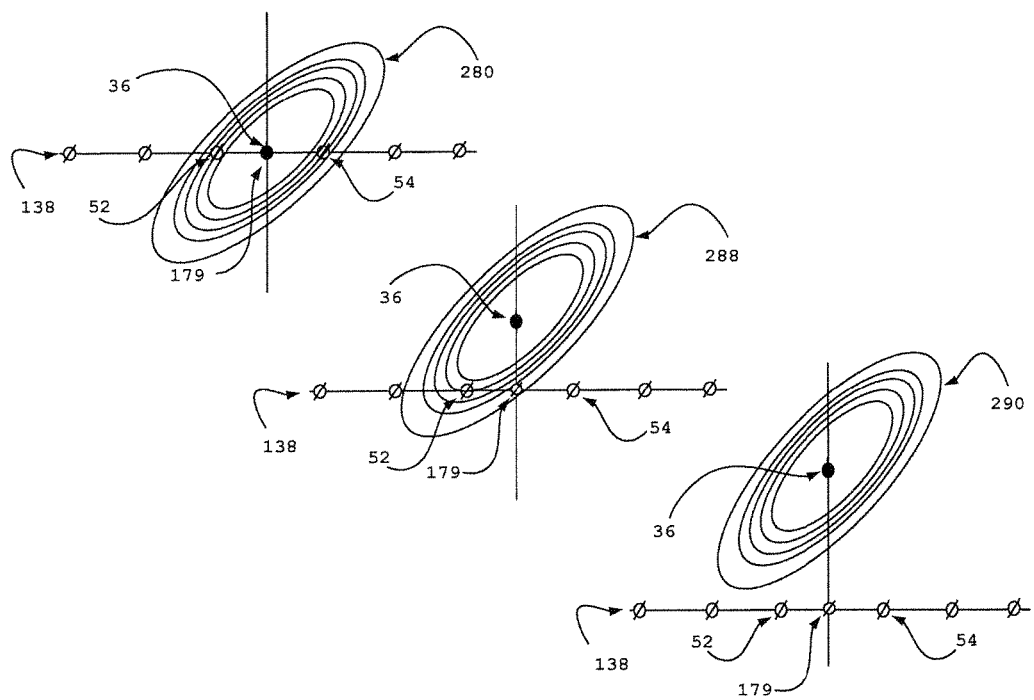
FIG. 23 is a series of diagram illustrating the effect of target satellite declination for a high axial-ratio, 45 degree skew angle, antenna gain pattern.

A representation of a high axial-ratio antenna at 45 degree skew angle gain as a function of declination is presented in FIG. 23. The client antenna is pointed towards target satellite 36. At 280, target satellite 36 is along the geostationary arc 138. At 288 target satellite has moved away (inclined) from the geostationary arc 138 with minimal decrease in gain towards satellite 52, but noticeably less gain toward satellites 54 and 179. Target satellite 36 is further inclined in 290 with decreasing gain along the geostationary arc 138.

Figure 24:
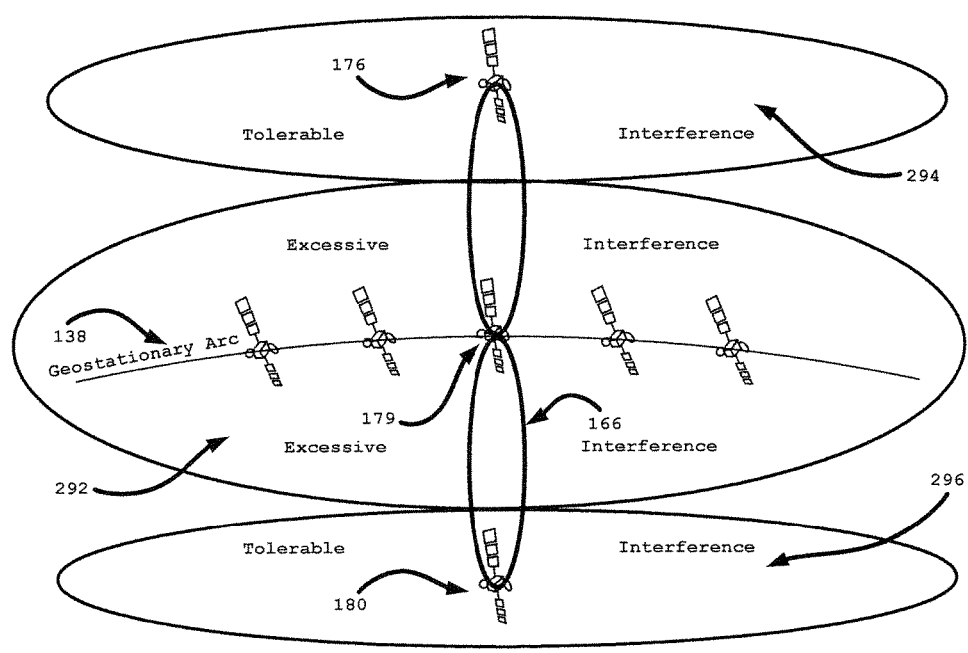
FIG. 24 is a diagram showing the view from a disadvantaged, small, steerable, fixed, or multi-position antenna communicating with an inclined orbit satellite according to the method of FIG. 18.

FIG. 24 illustrates support for more disadvantaged terminals than normally serviceable either with very small antennas or high axial-ratio antennas oriented at high skew angles. The disadvantaged terminal uplink would cause excessive interference in region 292 if pointed near the geostationary arc 138, and may receive too much interference in region 292 at the same time. The disadvantaged terminal may be able to complete an uplink due to increased permissible EIRP spectral density in regions 294 and 296 or complete a downlink due to reduced interference from adjacent satellites in regions 294 or 296 while the target inclined satellite is at locations 176 or 180, respectively. FIG. 24 can also represent the situation when sharing a geostationary slot with geostationary satellite 179.

Figure 25:
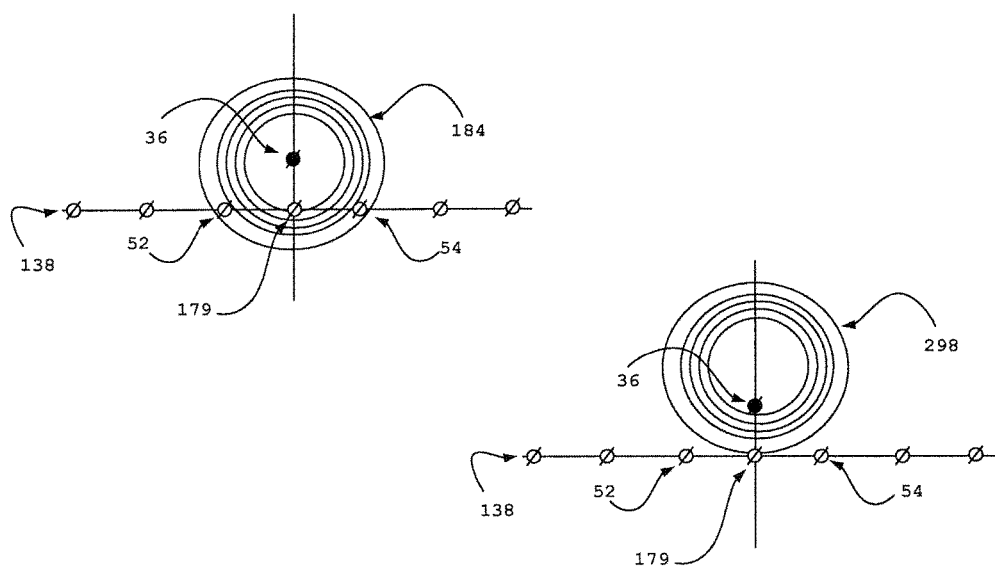
FIG. 25 is a diagram illustrating the effect of mis-steering an antenna with a circular antenna gain pattern.

Antenna beam pointing is a multi-loop process to minimize the effects of motion and beam-steering error. The antenna is presented with a steering command (azimuth, elevation, polarization). The steering command is normally aligned perfectly towards the target satellite. In some cases, there may be some benefit by mis-steering the antenna to a point further away from the geostationary arc. The gain may drop off slowly near the boresite and drop off more rapidly away from the boresite. Therefore, although the gain toward the target satellite decreases slightly, the gain toward the geostationary arc decreases substantially. FIG. 25 illustrates an inclined target satellite 36 with a centered circular beam pattern 184. The same antenna beam pattern is mis-steered upwards at 298 showing the target satellite remaining within the half-power beamwidth while significantly reducing the gain towards the geostationary arc 138.

Figure 26:
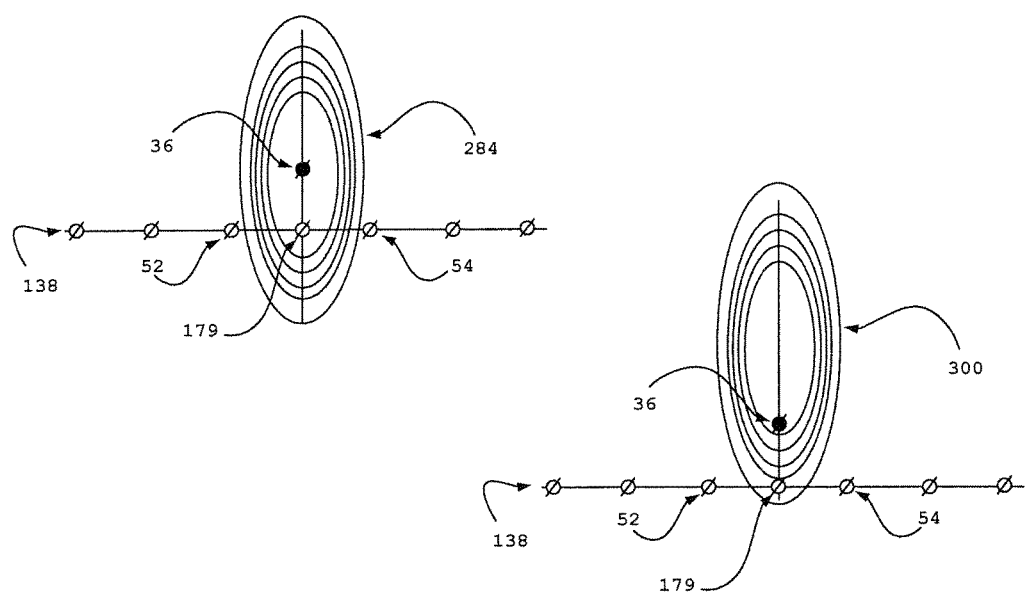
FIG. 26 is a diagram illustrating the effect of mis-steering an antenna with a high axial-ratio, zero skew angle, antenna gain pattern.

FIG. 26 illustrates an inclined target satellite 36 with a centered high axial-ratio, zero skew beam pattern 284. The same antenna beam pattern is mis-steered upwards at 300 showing the target satellite remaining within the half-power beamwidth while significantly reducing the gain towards the geostationary arc 138.

Figure 27:
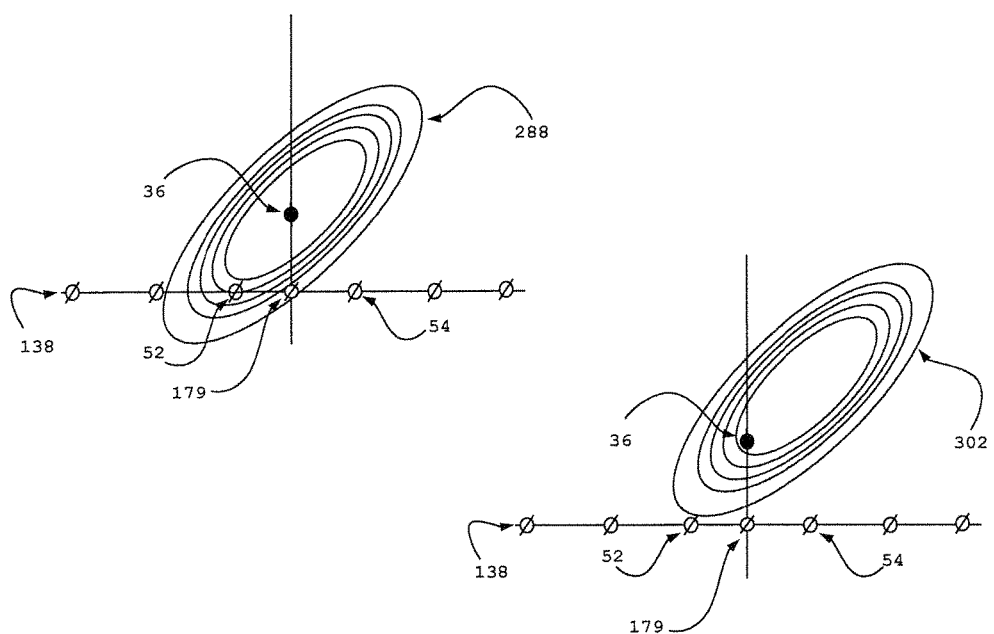
FIG. 27 is a diagram illustrating the effect of mis-steering an antenna with a high axial-ratio, 45 degree skew angle, antenna gain pattern.

FIG. 27 illustrates an inclined target satellite 36 with a centered high axial-ratio, 45 degree skew beam pattern 288. The same antenna beam pattern is mis-steered upwards and with different right ascension at 302 showing the target satellite remaining within the half-power beamwidth while significantly reducing the gain towards the geostationary arc 138, and especially toward adjacent satellite 54.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of communicating via a satellite, the method comprising:
    locating a target satellite in an inclined geosynchronous orbit wherein the target satellite shares a geosynchronous slot with a geostationary satellite;
    pointing an antenna at an aiming point offset from a geostationary arc, the antenna having a radiation pattern;
    estimating a maximum boresite Equivalent Isotropic Radiated Power (EIRP) Spectral Density (SD) that complies with a predetermined maximum EIRP SD toward the geostationary satellite based on the radiation pattern and the aiming point;
    encoding information into a radio frequency signal based on an information rate, coding parameters, and modulation parameters;
    transmitting the radio frequency signal to the target satellite at a transmitted boresite EIRP SD no greater than the maximum boresite EIRP SD
    adjusting the aiming point as a declination of the target satellite changes;
    revising the maximum boresite EIRP SD as the aiming point changes; and
    adjusting the transmitted boresite EIRP SD based on the revised maximum boresite EIRP SD.

2. The method of claim 1 further comprising:
    suspending transmission in response to an angular separation between the geostationary satellite and the target satellite decreasing to less than a threshold value.

3. The method of claim 2 further comprising:
    resuming transmission in response to the angular separation increasing to greater than the threshold value.

4. The method of claim 1 further comprising adjusting the information rate as the declination of the target satellite changes.

5. The method of claim 1 further comprising adjusting the coding parameters as the declination of the target satellite changes.

6. The method of claim 1 further comprising adjusting the modulation parameters as the declination of the target satellite changes.

7. The method of claim 1 wherein an absolute value of a declination of the aiming point is greater than an absolute value of a declination of the target satellite during transmission.

* * * * *